(12) United States Patent
Lane (10) Patent No.: US 6,941,353 B1
(45) Date of Patent: Sep. 6, 2005

(54) E-COMMERCE SYSTEM AND METHOD RELATING TO PROGRAM OBJECTS

(75) Inventor: Greg Lane, New Farm (AU)

(73) Assignee: Auran Holdings PTY LTD, Queensland (AU)

( * ) Notice: Subject to any disclaimer, the term of this patent is extended or adjusted under 35 U.S.C. 154(b) by 909 days.

(21) Appl. No.: 09/607,553

(22) Filed: Jun. 29, 2000

(51) Int. Cl.$^7$ .............................................. G06F 15/16
(52) U.S. Cl. ........................... 709/219; 705/26; 463/42; 463/43; 717/171; 717/173
(58) Field of Search ............................. 709/219; 705/26, 705/53, 54; 463/42, 43; 717/171–173, 108, 176–178

(56) References Cited

U.S. PATENT DOCUMENTS

| | | | |
|---|---|---|---|
| 5,155,847 A | * 10/1992 | Kirouac et al. ............. 709/221 |
| 5,166,886 A | 11/1992 | Molnar et al. .............. 364/479 |
| 5,291,598 A | 3/1994 | Grundy ....................... 395/650 |
| 5,375,240 A | 12/1994 | Grundy ....................... 395/700 |
| 5,497,479 A | * 3/1996 | Hornbuckle ................. 463/29 |
| 5,533,124 A | 7/1996 | Smith et al. ..................... 380/4 |
| 5,659,793 A | 8/1997 | Escobar et al. ............. 395/807 |
| 5,695,400 A | * 12/1997 | Fennell et al. ................ 463/42 |
| 5,708,709 A | * 1/1998 | Rose ............................ 705/59 |
| 5,748,731 A | 5/1998 | Shepherd ....................... 380/4 |
| 5,764,989 A | 6/1998 | Gustafsson et al. ......... 395/704 |
| 5,779,549 A | 7/1998 | Walker et al. ................ 463/42 |
| 5,781,732 A | 7/1998 | Adams ................... 395/200.35 |
| 5,794,006 A | 8/1998 | Sanderman .................. 395/500 |
| 5,826,102 A | 10/1998 | Escobar et al. ............. 395/806 |
| 5,890,963 A | * 4/1999 | Yen .............................. 463/42 |
| 5,898,430 A | 4/1999 | Matsuzawa et al. ......... 345/302 |
| 5,907,617 A | * 5/1999 | Ronning ....................... 705/52 |
| 5,907,704 A | 5/1999 | Gudmundson et al. ..... 395/701 |
| 5,920,725 A | * 7/1999 | Ma et al. ..................... 717/171 |

(Continued)

OTHER PUBLICATIONS

Jaffa Software, WimpWorks v2, Sep. 3, 1998, from http://thor.prohosting.com/~jsoft/product/wimpworks.html, pp. 1–3.*

Husted, "Free Downloads Let Gamers Try Before They Buy," Jan. 4, 1999, Chicago Tribune, p. 7.*

Arun "Rooney" Devidas, "Taking a Closer Look at the S.A.G.E. Engine," Sep. 8, 1999, http://www.pc.ign.com.

Rob, "Rebirth of the Independent Developer," Jun. 11, 2000, http://www.bigkid.com.au/articles/00_06/auranjet.htm.

*Primary Examiner*—Frantz B. Jean
*Assistant Examiner*—Bradley Edelman
(74) *Attorney, Agent, or Firm*—Kenyon & Kenyon (57) ABSTRACT

A system for distributing and selling program objects. The system has the ability to download a limited functionality program object from one computer system to another, then to allow a user to view and interact but not control that object without first purchasing the object online. Once this purchase is made, and additional program object or code is provided that gives the use control of the initial program object.

10 Claims, 4 Drawing Sheets

U.S. PATENT DOCUMENTS

| | | | | |
|---|---|---|---|---|
| 5,930,765 A | * | 7/1999 | Martin | 705/14 |
| 5,944,608 A | | 8/1999 | Reed et al. | 463/40 |
| 5,984,508 A | * | 11/1999 | Hurley | 700/237 |
| 5,984,786 A | * | 11/1999 | Ehrman | 463/42 |
| 5,999,740 A | * | 12/1999 | Rowley | 717/173 |
| 6,009,274 A | * | 12/1999 | Fletcher et al. | 717/173 |
| 6,009,410 A | * | 12/1999 | LeMole et al. | 705/14 |
| 6,009,458 A | | 12/1999 | Hawkins et al. | 709/203 |
| 6,016,504 A | * | 1/2000 | Arnold et al. | 709/200 |
| 6,029,182 A | * | 2/2000 | Nehab et al. | 715/523 |
| 6,049,671 A | * | 4/2000 | Slivka et al. | 717/173 |
| 6,061,656 A | | 5/2000 | Pace | 705/1 |
| 6,074,434 A | * | 6/2000 | Cole et al. | 717/173 |
| 6,088,739 A | | 7/2000 | Pugh et al. | 709/315 |
| 6,110,041 A | | 8/2000 | Walker et al. | 463/20 |
| 6,113,495 A | * | 9/2000 | Walker et al. | 463/42 |
| 6,125,402 A | | 9/2000 | Nagarajayya et al. | 709/304 |
| 6,126,546 A | | 10/2000 | Reet et al. | 463/40 |
| 6,134,593 A | * | 10/2000 | Alexander et al. | 709/229 |
| 6,179,713 B1 | * | 1/2001 | James et al. | 463/42 |
| 6,200,216 B1 | * | 3/2001 | Peppel | 463/1 |
| 6,219,836 B1 | * | 4/2001 | Wells et al. | 717/178 |
| 6,237,092 B1 | * | 5/2001 | Hayes, Jr. | 713/100 |
| 6,243,692 B1 | * | 6/2001 | Floyd et al. | 705/59 |
| 6,264,561 B1 | | 7/2001 | Saffari et al. | 463/42 |
| 6,282,711 B1 | * | 8/2001 | Halpern et al. | 717/175 |
| 6,334,214 B1 | * | 12/2001 | Horstmann | 717/170 |
| 6,352,479 B1 | * | 3/2002 | Sparks, II | 463/42 |
| 6,356,543 B2 | * | 3/2002 | Hall et al. | 370/352 |
| 6,367,077 B1 | * | 4/2002 | Brodersen et al. | 717/170 |
| 6,379,251 B1 | * | 4/2002 | Auxier et al. | 463/42 |
| 6,389,541 B1 | * | 5/2002 | Patterson | 713/201 |
| 6,402,618 B1 | | 6/2002 | Reed et al. | 463/40 |
| 6,467,088 B1 | * | 10/2002 | alSafadi et al. | 717/173 |
| 6,488,585 B1 | * | 12/2002 | Wells et al. | 463/43 |
| 6,493,871 B1 | * | 12/2002 | McGuire | 717/173 |
| 6,496,857 B1 | * | 12/2002 | Dustin et al. | 709/219 |
| 6,496,979 B1 | * | 12/2002 | Chen et al. | 717/178 |
| 6,507,833 B1 | * | 1/2003 | Hichwa et al. | 707/1 |
| 6,513,111 B2 | * | 1/2003 | Klimczak et al. | 713/1 |
| 6,536,039 B2 | * | 3/2003 | Sanford | 717/173 |
| 6,554,707 B1 | * | 4/2003 | Sinclair et al. | 463/39 |
| 6,578,199 B1 | * | 6/2003 | Tsou et al. | 717/178 |
| 6,651,249 B2 | * | 11/2003 | Waldin et al. | 717/170 |
| 6,668,375 B1 | * | 12/2003 | Leovac | 717/174 |
| 6,669,564 B1 | * | 12/2003 | Young et al. | 463/42 |
| 6,725,260 B1 | * | 4/2004 | Philyaw | 709/220 |
| 2001/0003714 A1 | * | 6/2001 | Takata et al. | 463/40 |
| 2002/0129349 A1 | * | 9/2002 | Ebisawa | 717/172 |

* cited by examiner

E-COMMERCE SYSTEM AND METHOD RELATING TO PROGRAM OBJECTS

FIELD OF INVENTION

The present invention is directed to a computerised system to distribute computer program objects, and more particularly, to a system that allows users to gain control over certain features of program objects.

COPYRIGHT NOTICE

A portion of the disclosure of This patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

In recent years, there has been enormous growth in Internet, especially for distributing software products.

Many systems have been devised to allow users to purchase computer programs via the Internet. In some systems, programs are provided free of charge in limited functionality mode, and once a license fee is paid, a code can be entered to allow use of full functionality of that program.

Examples of such systems are described in patents such as U.S. Pat. Nos. 5,291,598 and 5,375,240 to Grundy. Generally, these systems relate to locking and unlocking specific functionality in a computer program. It is also known to transmit computer games electronically to users via a network. See U.S. Pat. No. 5,944,608 to Reed et al.

In programs such as computer games, users like to select and use various components, such as characters, weapons, and missions. There does not exist a system that provides users with additional objects for use in a program that they currently own and are running, where such objects automatically are displayed to the user in the program, but where the objects cannot be controlled by the user until the user decides to acquire them.

Accordingly, there does not exist a system that in real-time, and without user intervention, provides an additional component with limited functionality for an existing computer program, and then easily allows users to obtain a corresponding full functionality component.

There is a need for a system that automatically provides the user with additional limited functionality objects for an existing program of the user, and that "taunts" the user with these objects thus increasing the likelihood that the user will purchase the corresponding full function object.

Moreover, existing technology requires users to shutdown and start a program when there is a change from limited functionality to full functionality. This is undesirable, particularly in multiplayer games.

Existing online selling systems for software may provide users with a limited functionality program, where the additional features are hidden from the user, completely disabled or only work for a limited period of time. Thus, the user is not given a full opportunity to be exposed to the complete aspects of the program. Moreover, these systems are directed to selling complete application programs, and not individual features (or objects) for use in programs that a user already owns. These systems also do not provide additional features to be included in an application program for a user to consider and that are created after creation of the application program.

It is also important to balance the need for efficiently converting an object from limited functionality to full functionality (for example, in terms of download size, ease of use) with the need for a secure system to prevent piracy.

Many people like collecting unique objects. Computer programs often replicate real world domains of interest to collectors and hobbyists, such as model train, model car and roller-coaster environments. When a user purchases such a program, there are a limited number of objects (e.g., train engines and cars) provided with the program for use therein. In some cases, users can design and build their own objects from parts that are provided. However, many collectors would like the ability to customize and purchase unique objects for use in such programs, and trade these objects with other collectors using the same program.

There does not exist a computer system that allows for the creation of unique program objects for use in existing computer programs, particularly where such program objects can be used and traded by collectors and other interested people.

SUMMARY OF THE INVENTION

The present invention is directed to a computer-implemented system to allow the downloading of objects to be used in an application program. The objects are downloaded from a server to a user's local or client computer. The server runs a server program which accesses one or more databases. The application program is running on the client computer.

The system of the present invention is called herein an e-commerce system ("AES"). For ease of reference, the server is called the AES server system, which comprises AES server software and one or more databases. The application program according to the present invention is called herein an AES enabled client application, or host application for short. The host application can be any computer program that has been enabled to work with the AES system of the present invention. The host application, when AES enabled, includes an AES client, which is also a computer program.

The objects of the present invention are typically programming objects that perform a pre-specified function when running on the client computer in conjunction with the host application.

According to the present invention, there are two types of objects, namely full functionality objects ("FFO") and limited functionality objects ("LFO").

A LFO is an object that can be used by the host application but subject to certain restrictions. The FFO is an object without these restrictions. However, both the LFO and FFO will still have certain restrictions and constraints, as appropriate, determined (for example) by the AES system operator.

When a user is using the host application, the user may wish to purchase or otherwise acquire a FFO. The user may have a LFO, and wish to purchase or otherwise obtain the corresponding FFO. Alternatively, the user may be aware of the FFO and wish to purchase or obtain it outright. The AES client, in conjunction with the AES server system, can initiate the appropriate process to enable the user to do so. After the downloading required material, the FFO can be used by the host application.

An example application of the present invention can be explained as follows.

Assume that the host application is an entertainment computer program that allows users to build virtual model train layouts, and to collect and organise virtual model train engines and carriages. When the AES client is coupled to the Internet, it may automatically download from the AES server system a newly designed train engine. This train engine will be downloaded as a LFO, and made available to the user via the host application as part of the user's model train collection. However, being a LFO, the user may be allowed to use the train engine in the AES client but without carriages. If the user wishes to connect carriages, the user will need to obtain the corresponding FFO.

As another example, assume that the host application is a program that allows users to drive and race cars. The system operator may make available a series of 1950's collectable cars, with 50 in the set. A user can visit the system operator's website and select the kind of car that they wish to use. Assume that the user selects "Cadillac". The user is then given the option by the AES server system to choose other details about the car. For example, the user may be allowed to select the State of registration (which will appear on the license plate), the color of the car and type of wheels. In other words, the user can customise the virtual car. Here, in this example, the car is represented as a FFO. (Alternatively, the car could be a LFO if some functionality is withheld until the user decides to acquire the corresponding FFO.) The AES server system will add a further element of uniqueness to each car prior to or during the download phase of the FFO. For example, the AES server system can select the actual license plate numbers and letters for the State selected by the user, e.g., ABC 123. Accordingly, the AES server system can be configured to ensure that each LFO and FFO is unique, and can keep a record of which user obtains this unique car. After downloading of the FFO, the user can display and drive the car in the host application. (If the user acquired a LFO car, the user may be able to view the car, but not drive. The LFO car may also race against the user, using AI technology.)

To summarise the above example, in one embodiment of the present invention, there can be three levels of customisation. The first level is the choice of the base product, typically made by the user. The second level is the user selecting and customising features of the product. The third level is the AES server system customising other features, thus creating (if desirable) a unique product.

As will be apparent, if unique products are created, then they will be regarded by users as collectables. Many users will value this uniqueness.

The present invention allows users to trade and transfer LFOs and FFOs, such as the train engines and cars in the above example. The AES server system can keep track of ownership of objects (LFOs and FFOS), and provide information to users to assist them determining whether they are acquiring a genuine object. Thus, the AES server system can be queried to determine the authenticity of a product (e.g., LFO and FFO).

The AES server system can also operate a trading and/or auction website to allow users to purchase new products and to trade products that they have previously purchased.

The AES server software can, at the third level of customisation discussed above, keep control over which individual products are actually released. This enables the creation of special unique products. For example, in the car example discussed above, the system operator could decide not to generally release the black open top Cadillac in which President Kennedy was assassinated. This car, made to be identical to that in the real event, such as including license plates and engine numbers, could be auctioned by the system operator via the AES server system (or on another website) to the most interested user. Other famous cars, such as those used in movies, famous events, first in a series, etc., could be released in a similar way.

Accordingly, the AES server system can catalog each downloaded object, and keep a record of the product, how it is unique and who it was provided to. The ability to alter a set product in some way, by inserting data into it, or appending data to it, just prior to or as part of the download is an feature of the representative embodiment of the present invention.

There are some times, however, where there is less customisation, and all that may be added is a product serial number to assist prevention of piracy. For example, in a traditional combat computer game (host application), the AES server system may make available in the game a character (LFO). The character interacts with the user's character, for example, by shooting at the user's character with a new type of weapon and can run much faster than existing available characters. However, the user cannot control that new character. In short, because the new character is a LFO, the user can interact with it but not control it. If the user wishes to control that character, the user must obtain the FFO version of the character. With the FFO version, the user can select that character (including the associated attributes) for the user to control in the game.

In one aspect, the representative embodiment of the present invention has the ability to display program objects (e.g., LFO) of any description to a user, and has the capability to allow the user to ultimately gain control of the program object (e.g., FFO).

As will be apparent, the present invention is not limited to the objects discussed above (train engines, cars, characters in computer games). There are many other examples, such as dogs, cats, and aeroplanes. Project objects can include art, sound, text, program code or other forms of computerised objects. The host application can include fantasy and futuristic games.

Taking art as an example, the host application may be an art gallery program. The LFO could be a new wing of the art gallery, which comprises low resolution quality images. The FFO would be the same wing added to the gallery with high quality images and descriptions.

In a fantasy game, the objects can be an entire mission, a character, a place or a tool.

A summary of a sample session using a representative embodiment of the AES of the present invention is now discussed. Example steps include:

Step 1: The user visits a website and views available products. The user selects a product, in this case a host application which is a computer game.

Step 2: User enters in credit card details, or provides user name and password if user has made prior purchase.

Step 3: Credit card information verified.

Step 4: User provided with transaction code, and download of product begins.

Step 5: Host application installed on client computer, and user plays game.

Step 6: While playing game, and provided client computer is coupled to the Internet, AES server system downloads a small program object (LFO) to the client computer. Once download is complete, the object would be displayed to the user in a limited way.

Step 7: User sees object in the product, and likes it. User clicks on the object to buy it.

Step 8: Using credit card details provided at step 2, payment is validated. AES server system electronically provides user with corresponding FFO.

Step 9: The user can use the object without having to restart the game.

In one aspect, the AES client taunts the user. It provides the user a new object in a limited way and then enables the user to easily purchase the full functionality of the object.

The above description assumes an Internet connection. However, LFOs can be provided on disk, such as CD-ROM.

As will become apparent below, the present invention is not so limited to the representative embodiments discussed above, and has many uses outside of games and collectables. As discussed in detail below, the present invention is not so limited, and can be used with a wide variety of client software, including educational programs, reference programs and the like.

Generally, the present invention relates to the distribution and integration of computer generated or encoded objects, be they art, sound, music, text, non-physical objects such as environmental variables or artificial intelligence parameters, program source code, program pseudo code, program compiled code or any other computerized objects.

In summary, in one embodiment, the present invention has the ability to download a limited functionality program object from one computer system to another, then to allow a user to view and interact but not control that object without first purchasing the object online. Once this purchase is made, an additional program object is provided that gives the user control of the initial program object.

DETAILED DESCRIPTION

Figure 1:
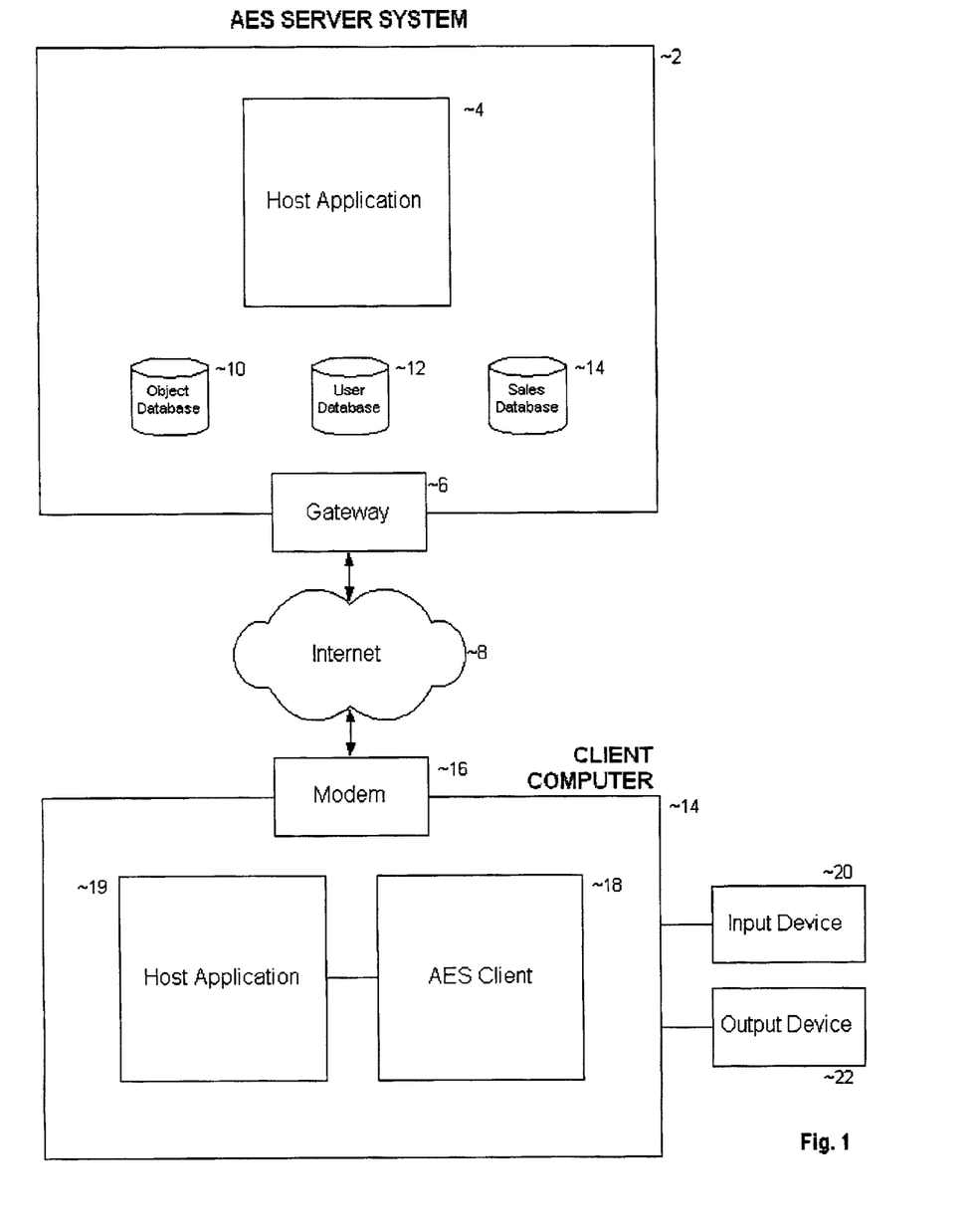
FIG. 1 is a high level block diagram illustrating the representative hardware and software components of a representative embodiment of the present invention.

Referring now to the drawings, and initially FIG. 1, there is illustrated in block diagram form the representative hardware and software elements and configuration of the AES-based system according to a representative embodiment of the present invention.

The representative embodiment of the present invention uses a client-server model to facilitate communications between a user's machine (the client) 14 and the AES server (the server) 2. Client-server architecture is well known in the art and is suited to the functions of the present invention, for example, filling client requests for program objects. An overview of an appropriate hardware configuration for both the client and server is described. Using this configuration, the representative embodiment of the invention can be employed.

The client computer 14 runs a host application 19 and an AES client 18.

Due to the nature of the software of the present invention, the underlying hardware is not vital for the purposes of the invention. The server 2 can be constructed using any hardware so long as:

the server 2 is a computer;

the underlying hardware can execute the server software 4; and the server 2 is connected to the Internet 8 or other computer network through some type of gateway 6.

Preferably, the connection to the Internet 8 is a permanent connection.

The client computer 14 most commonly consists of a personal computer. Similar to the server, the exact selection of hardware is not vital, and indeed the AES client 18 is written to take advantage of new hardware platforms (such as handheld devices) as they become available. For the purposes of the representative embodiment, the client computer 14 is a PC with a modem 16. The modem 16 allows the client computer 14 to be coupled to the Internet 8. The client computer 14 is capable of executing AES enabled software, such as the host application 19 of the representative embodiment.

In the representative embodiment, the client computer 14 is used other content, play games and run other application programs. The client computer 14, such as a multimedia personal computer (MPC), comprises a processor (not shown), such as an Intel Pentium processor, RAM (not shown) and a hard disk drive and hard disk (not shown). Although the processor can be any computer processing device, the representative embodiment of the present invention will be described herein assuming that the processor is an Intel Pentium processor or higher. The hard disk of the client computer 14 stores an operating system, such as the Microsoft Windows 98 or Windows NT operating system, which is executed by the processor. The present invention is not limited to the Windows operating system, and with suitable adaptation, can be used with other operating systems. For ease of explanation, the representative embodiment as described herein assumes the Windows 98 operating system.

Application program computer code, such as the AES client 18 and host application 19, is stored on a disk that can be read and executed by the processor. In the representative embodiment, the user's computer 14 will have a web browser program (such as, for example, Microsoft Internet Explorer or Netscape Navigator).

As stated above, the client computer 14 is coupled to the Internet 8. Typically, the computer 14 will be coupled to the Internet 8 via a modem 16.

Coupled to the client computer 14 are one or more input devices 20, such as a keyboard, mouse, joystick, trackball, microphone, scanner, and the like. Also coupled to the client computer 14 are one or more output devices 22, such as a monitor, sound speakers, printer, and the like.

In the representative embodiment of the present invention, users, through the client software 18 and host application 19, request objects from the server system 2. This procedure requires specialized software running on both the client 14 and server 2. These software processes are described below.

As discussed above, the user's client computer 14 is coupled to the Internet 8. Also coupled to the Internet is the server system 2 operated by a system operator. The system operator ideally has a website controlled by the server system 2. The server system 2 runs the server software 4 (implementing, in part, functions of the present invention) and a number of databases 10, 12, 13 (discussed in detail below).

The databases 10, 12, 13 can be implemented using a database program. For example, the Microsoft SQL Server or Oracle database programs can be used to implement these databases. This document describes three databases, but as is known in the art, these databases can be combined or spilt, as required.

Generally, the server system 2 has four components:
1 the AES specialized server software 4;
2 the object database 10;
3 the user database 12; and
4 the sales database 13.

The first of these server components, the server software 4, is described in the AES enabled server section. The three databases (object 10, user 12 and sales 13) are described below.

Object Database 10

In the server software 4, objects requested by the user are created and sent to the user on a just-in-time basis. As each base object can, optionally, be modified in many ways, storing all possible user requested objects is inefficient (if possible at all). Due to the number of possible combinations, the Object database 10 stores object templates.

As the name implies, object templates are not complete objects themselves. They are used by the server software 4 as a foundation from which to build the requested object. Object templates are different for each type of object but all share a number of common properties. A typical template:

1 contains a pre-packaged limited functionality object of the given type;
2 can be used to create a fully functional object of that type;
3 contains the rule-set for allowed user customization;
4 contains the rule-set for automated server system 2 customization; and
5 may contain specific disallowed or reserved object configurations.

The limited functionality object (LFO) is an object that can be used by a host application 19. There are however, restrictions placed on the object unlike standard objects (fully function objects—see below). These restrictions are imposed by the AES server 2 not sending certain functional object components. The host application 19 uses the LFO to allow restricted interaction and experience of the complete object.

Each object template in the Object database 10 also can contain the complete set of functional components of a full functionality object (FFO) of its type. In the representative embodiment of the invention, there are two possible methods an AES client 18 can use to obtain a fully functional object. If an LFO of the same type has previously been downloaded, the server software 4 only requests the missing functional components (i.e. the data and/or logic in the FFO that is not in the LFO). Briefly, the Object database 10 then obtains the appropriate components from the template's FFO and returns only those components, not the entire FFO, to the server software 4. This greatly reduces the size of the required data transfer to the client 18. If no LFO of the requested type has been downloaded, the Object database 10 retrieves all the FFO's data and logic. The server software 4 then sends the entire FFO to the client 18.

The server software 4 allows users to customize objects before they are downloaded. Not all aspects of an object are necessarily customizable. Object templates in the Object database 10 can contain a set of rules (a rule-set) that the server software 4 uses to determine the object's valid customizations. Using a simple example of a car, the user customization rule-set may allow the user to determine the car's color, trimming and accessories.

In addition to the user, the server software 4 can also customize an object. Object templates can contain a rule-set listing the customizations the server software 4 may make before sending the object to the AES client 18. This automated customization allows AES objects to be uniquely identified. Each object can, for example, be encoded with an identification number. This number can then be used for copy protection and/or user registration (see below) depending on how the server software 4 and/or Object database 10 are configured.

Another component of each object template can be a rule-set containing reserved or invalid customizations. The server software 4 checks this rule-set to verify that the customizations from both itself and the user are valid. As the server software 4 checks for reserved customizations, the server software 4 can maintain higher degrees of control over object creation. If a car example is examined, a certain number plate combination, for instance 'ABC-123', may be reserved for a specific situation or even a particular user.

User Database 12

When an FFO is downloaded by an AES client 18, it may be registered to the user. The user's information should be made available to the AES server 2. The User Database 12 stores pertinent user information. Some of this information may be required to perform transactions while other information is used for appropriate marketing and object distribution selection.

Information held in the database can include entries such as the user's:

1 full name;
2 postal address;
3 phone number;
4 credit card details;
5 email address; and
6 areas of interest (e.g. model trains, cars, sports, World War II, fantasy and science fiction)

To obtain the information, the present invention can use several methods. In the representative embodiment, the information is sought, with consent, from the user during the installation of host application 19. The user may opt however, to provide the information each time they contact the server 2, to enter the service Sales Database 13

The Sales Database 13 contains the transactions that have been processed using the server software 2. By storing this information, the Sales Database 13 decreases computer piracy and acts as an object ownership registry. Each sale record in the database 13 can store the following information:

1 a reference to the purchasing user;
2 a reference to the object template used;
3 modifications the user made to the object template;
4 modifications the AES server made to the object template;
5 the unique object identifier assigned to the object after all modifications were made; and
6 the transaction information (date, time, cost, etc.).

As Internet access becomes more common throughout the world, the Sales Database 13 will become more effective against computer piracy. As each unique object sent to a user is identifiable, the server software 4 can detect when multiple copies of the object are simultaneously used online. Once multiple copies are detected, appropriate action can be taken. This type of detection system should hinder and deter computer piracy of AES objects of the present invention.

Another advantage of storing extensive transaction records is that an object's ownership can be verified. The server system 2 is similar in this respect to a title register, for example, for land. Before a land purchase, a purchaser verifies the vendor actually owns the land. In much the same way, the AES server 2 assists users transfer their objects to others. The server software 4 can verify the ownership of an object (without releasing user information) and assign the ownership of the object to another user. The object can be transfer to the new owner directly, or via the AES server 2.

Client Software Configuration

To use the features of the present invention, the user obtains and installs a host application 19. The host application is a computer program (such as, for example, a computer game) that is enabled for use as a client application by the present invention. The host application 19 includes, or is coupled to, the AES client 18. Once the host application is executed, the host application 19 enables the AES client 18. When the AES client 18 is executed, it attempts to contact an AES server 2. As will be appreciated, there can be more than one client computer 14, and more than one server system 2 that communicate. If the AES server 2 is found and an object, either an LFO or FFO, is downloaded, the host application 19 renders that new object using appropriate mediums such as video and sound. In addition to merely rendering the new object, the object is integrated into the host application 19 during the normal execution—the user does not have to issue any specific commands. Detailed procedural features of the host application 19 are described below in AES enabled client application operation.

Procedures

AES Enabled Client (Host) Application 19 Operation

Figure 2:
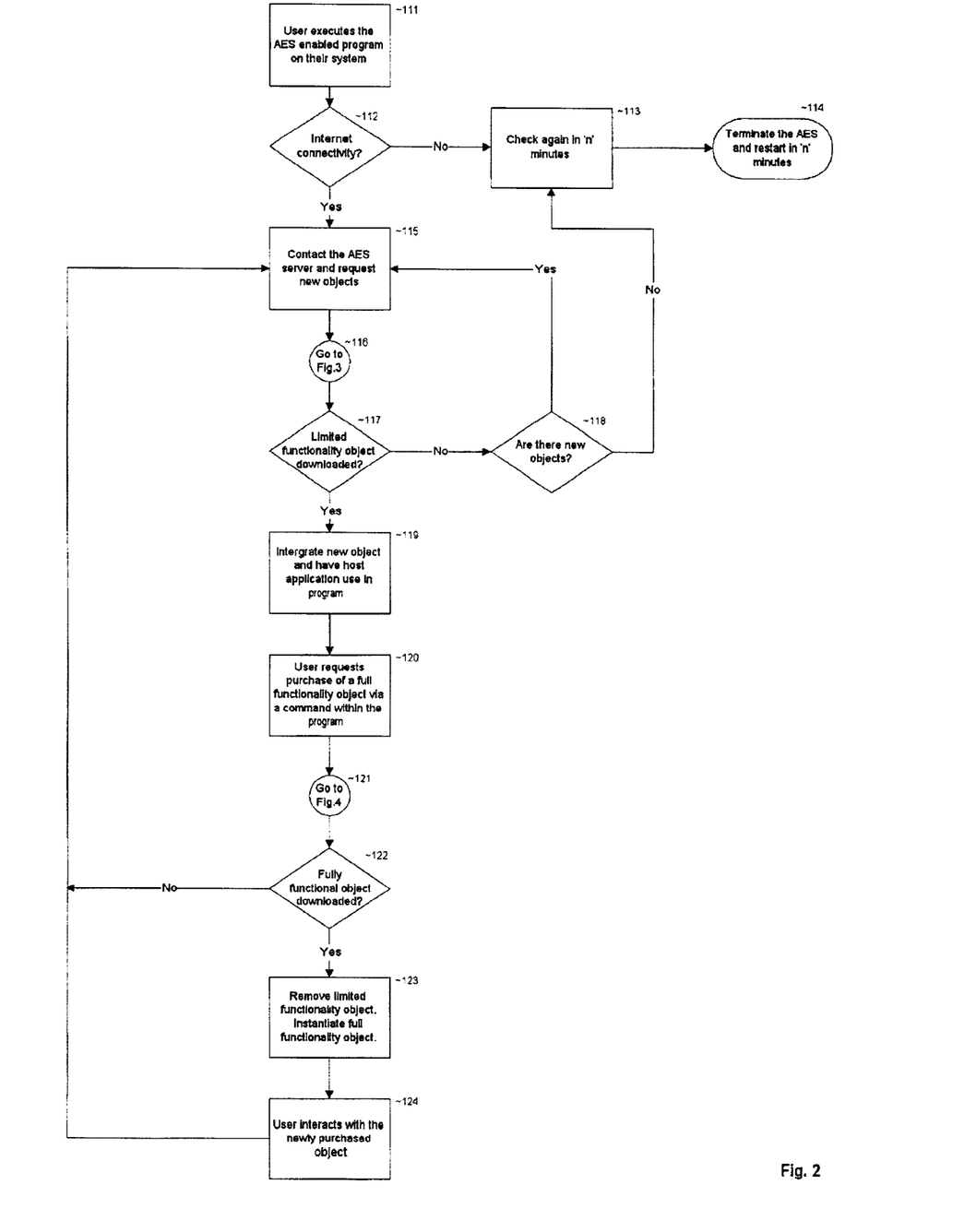
FIG. 2 is flow chart of the steps of the AES client enabled host application operation of a representative embodiment of the present invention.

FIG. 2 illustrates the normal operation of an AES client 18. The AES client software 18 is executed from within an AES enabled application, called the host application 19 herein, as a low priority process. While the host application 19 is still running, the AES client 18 follows the stages outlined in FIG. 2 as a background task.

The AES client's 18 first requirement is that its host application 19 is running 111. This normally requires the user to execute a program on their PC 14 either using a typed command or clicking an icon. The host application 19 can also be executed, for example, by simply switching on a handheld device or from within an already running program on the user's PC 14 such as a web-browser.

Once the host application 19 is running, the AES client 18 commences its operations as a background task. As the AES is an Internet-based technology, the client 18 first checks for Internet connectivity 112. There are numerous ways to verify an Internet connection familiar to those skilled in the art. Each AES client 18 uses a means appropriate to its operating platform. As will be appreciated, other computer networks can be used in addition to or instead of the Internet.

If no Internet connection is found, the client 18 ceases operation for a set period of time 113. The client 18 instructs the host application 19 to restart it after that time period has elapsed 114.

The AES client 18 contacts the AES server 2 if Internet connectivity is detected 115. As the present invention was designed to allow new objects to be integrated into a running program, the AES client 18 seeks new objects from the AES server 2 while the host application 19 continues to execute. The client 18 contacts the server software 4 and requests new objects 115. Before downloading a new object, the client 14 and server 2 establish communications to determine which, if any, objects are appropriate for the client 116—this is explained below in AES server-side object request operation section.

The client 18 checks the outcome of the communications with the server 2. The client 18 firstly determines if a new object was downloaded 117. If not, the return code (or error code) from the server software 4 is checked. That code allows the client 18 to test whether there were new objects 118. If no new objects were found, the client 18 ceases operation and restarts after a given period 113, 114. If testing the return code determines there were new objects but the download failed, the client 18 re-establishes communications with the server software 4 and attempt the operation again 118.

After determining that a new object was downloaded 117, the client 18 integrates the object into the running host application 19. The host application 19 has the appropriate components to use the object as a local resource. To render the object to an output device, the client 18 informs the host application 19 of the object's existence 119. As the new object conforms to the application's object standard (i.e. it is in a format readable to the application), the application 19 integrates the object into its running program similar to loading a Dynamic Link Library (DLL). The host application 19 instantiates the new object based on the data received from the AES client 18. After instantiation, the object is available to render, for example, on-screen or to a sound device. As previously explained, the object has all the appropriate code and assets (e.g. 3D models and textures) the host application 18 requires. The host application 19 treats the new object as a standard program object that has a number of functions and properties. By being able to download and integrate new objects into an executing program, the present invention allows users to receive program additions and expansions with ease.

As the background download is usually an LFO, the object is partially disabled. To obtain full functionality, the user may choose to download the FFO. Using a command within the host application 19, the user may request the AES client 18 to obtain the object's missing functional components 120. Once the command is received by the client 18, the AES server 2 is again contacted 121. The required processing for this section is explained below in AES server-side full object purchase operation.

Depending on the user's decisions during the FFO request (see below), a new FFO may be available to the host application 19. The AES client 18 checks whether an FFO was downloaded 122. If there was a failure during the download, the client 18 returns to its normal operation 115. However, if an FFO was downloaded, the client 18 prepares the new object for integration into the host application 19.

As the AES client 18 has determined a new FFO exists on the local system 14, it has the host integrate the object into the application 123.

After the host application 19 integrates the FFO into the program, the user can control and interact with the object in its fully functional form 124. The AES client's processing is complete for that object. The client 18 now resumes its background operations 115.

AES Server-side Object Request Operation

Figure 3:
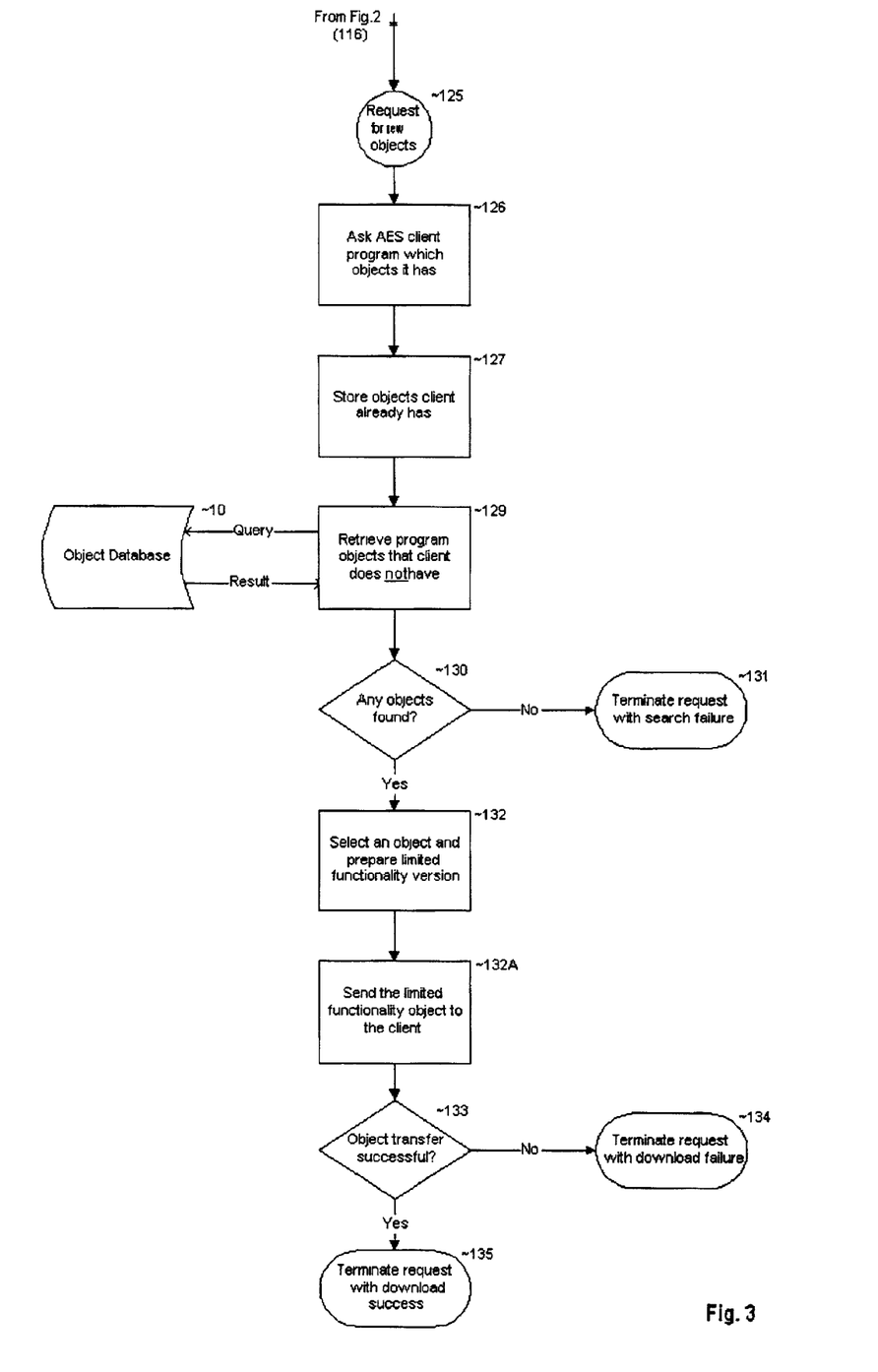
FIG. 3 is a flow chart representing the AES server-side object request operation according to the present invention.

FIG. 3 represents the sequence of events the AES server 2 and server software 4 take when an AES client 18 requests an LFO. The following description also includes the communications and processing for the AES client 18.

The present invention uses a client-server architecture whereby AES clients 18 initiate communications with the server 2. As such, the LFO request commences with an incoming request from a client 125. The server 2 accepts connections on a known port (i.e. the client 18 knows which port on the server machine to contact). This is a standard client-server configuration widely used.

LFOs are used to enable the user to preview and interact with new objects as they become available. As older objects have already been considered by the user, the server 2 determines which objects the client 18 already has 126. This is completed by, in effect, obtaining information from the host application 19. The server software 4 requests a list of previously obtained objects from the AES client 18. The client 18 then requests that list from the host application 19. The client 18 sends the obtained list back to the server software 4. The lists contains the LFOs and FFOs present in the host application 19. The server 2 makes a temporary copy of the client object list 127.

Using the client object list 127, the server software 4 determines which objects to send to the client 18. This requires two processes.

Using standard database retrieval techniques, the server software 4 queries the Object Database 10. To achieve appropriate results, the server software 4 uses the client's object list and application type. Thus, by narrowing the query, the Object Database 10 only returns those objects the client 18 does not have for the appropriate host application 19.

The server software 4 now has a list of valid objects that it can send to the client 18. Due to bandwidth considerations, the present invention is configured to send only one object at a time. As broadband Internet access increases, the present invention is easily configurable to allow for simultaneous LFO downloads. In this embodiment however, only one LFO at a time is sent to the client 18. If no objects were returned 130 from the Object Database 128, the server 2 transmits a search failure to the client and the process terminates 131. If multiple objects were returned, the server must choose one LFO to send to the client.

Where there are a number of new objects that the client 18 does not have, the server 2 must decide which to send. In so deciding, the server software 4 has two options. Firstly, the server software 4 can simply pick an object at random. This is the simplest option and should ensure an even spread of object distribution. A more complex, but more user orientated, method is to examine user preferences. This option requires extra processing and data storage and is not detailed in this embodiment but is a possible extension of the invention. In the representative embodiment (as illustrated in FIG. 3), the server randomly selects an object 132. After selecting which object to send, the LFO is extracted from the Object Database 10. The server then transfers the LFO to the client 18 (step 132A).

The final process the server software 4 completes is to check that the LFO transmits successfully 133. If the client download is successful, the process terminates successfully 135. If there is an error during transmission of the LFO, the process terminates with a download failure 134. The LFO transmission could be retried but as the LFOs are simply for preview purposes, the process can simply start again (see FIG. 1).

AES Server-side Full Object Purchase Operation

Figure 4:
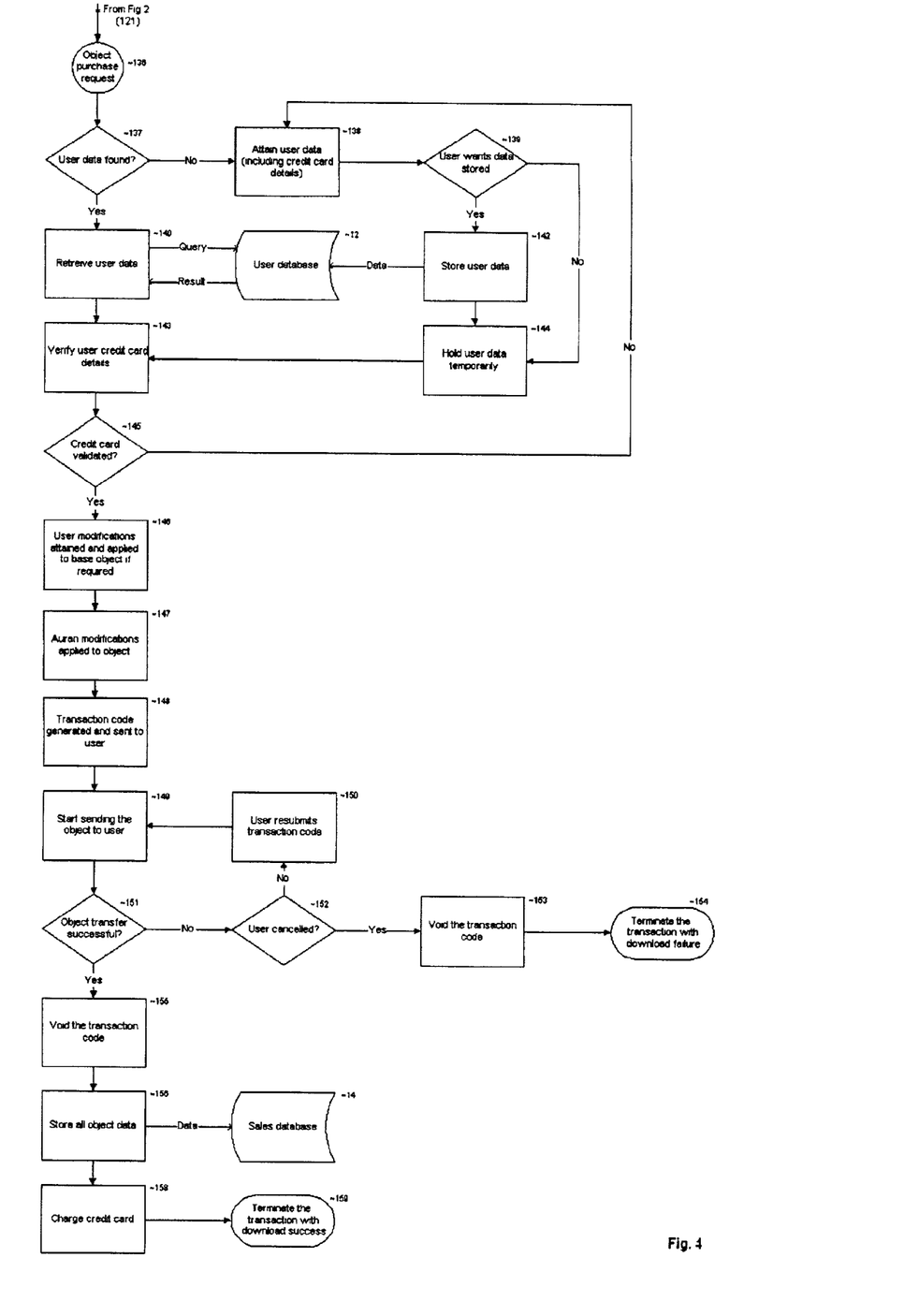
FIG. 4 is a flowchart representing the AES server-side full object purchase operation according to the present invention.

FIG. 4 illustrates the procedure the AES server software 4 follows when the user, through AES client 18, requests an FFO. This section details the stages of obtaining user and object details, producing the required FFO and the subsequent delivery and charging to the user.

The AES server 2 responds to incoming requests on a known communications port. When the user executes the appropriate command in the host application 19, the AES client 18 contacts the AES server 2. The AES client 18 sends a request for an FFO to the AES server's known communication port. At this point, item 136 is entered.

The first phase the server software 4 enters is verification of whether the user's information is available 137. This is accomplished by querying the User Database 12. If the user has not previously stored their information, the server 2 instructs the client to get tie information from the user 138.

To obtain the user information required, including credit card details, the AES client 18 prompts its host application 19. The application 19 uses appropriate input means to obtain the information from the user. The user is also asked if they want their information stored on the AES server 2 (in the User Database 12) for later use. The application 19 passes this information back to the AES client 18. The client 18 then sends the information to the server 2.

The server software 4 now has access to the user information. The server software 4 checks whether the user wants that information stored 139. If so, the data is submitted 142 to the User Database 12.

When the User Database 12 was first queried 137, it may have found the user's information. If so, the information is extracted from the User Database 12 and stored temporarily 143.

The server software 4 now has the user's information temporarily stored and ready for the proposed transaction.

The server software 4 verifies the user's credit card details 145. There are numerous ways of accomplishing this task. The method chosen by the server depends on a number of factors: for example the type of credit card, the country the user is from and the cost of the FFO. The server chooses an appropriate method and validate the user's credit card details. It does not however, charge the credit card at this point. If the details are invalid, the user is prompted via the host application 18 to update them 138.

Once the credit card details are confirmed, the server software 4 begins customizing the template object (see the customization sections) 146, 147. The server software 4 allows changes from the user and be able to change the object itself. Not all aspects of each object can be modified by the user. Each object template has a rule-set specifying which characteristics can be modified by the user. The server software 4 extracts these characteristics and instructs the AES client 18 to prompt the user, using the host application 19, for appropriate responses to each characteristic. The AES client 18 then sends the user's choices to the server 2. Upon receiving the data, the server 2 applies those changes to the object. To adapt a template object, a series of operations are performed (see AES enabled server). After applying the changes, the object is prepared for transmission to the client 14.

To ensure each object's uniqueness, a transaction code is generated 148. The code can be used only once as it uniquely identifies the new object's specifications. The transaction code is sent to the user so a download can be restarted in the case of failure 150.

The customized object is sent to the AES client 18 (step 149). It contains the object in its fully functional form and includes all the required functional object components. Thus, the new object is an FFO. To complete the transaction, the FFO is sent to the client 18. After the transmission is complete, the AES client 18 integrates the FFO into the host application 19 as illustrated in FIG. 2.

Due to the nature of the Internet, download problems may occur. If the client 18 did not completely receive the object 151 the server must determine why. There are two possibilities. The user may have cancelled the operation by issuing a cancel command in the host application 152. If so, the server 2 should destroy the customized object and void the transaction code so it cannot be used again 153. The server 4 then terminates the process and signals to the client 18 that the download failed 154. If however, the user did not cancel the download (i.e. there was some type of input/output error), the user is asked to restart the download by entering the transaction code 150. Upon receiving the transaction code, the server software 4 attempts to send the customized object again 149.

If the object is successfully downloaded 151 the server software 4 ensures no further downloads of the same object occur. As each transaction is uniquely identified by its transaction code, the code is voided 155.

To allow for greater copy protection and the server software 4 to act as an ownership verification system, the sales details are stored 156 in the Sales Database 13. The details saved include the user information and the transaction code.

The final requirement the server software 4 fulfils is, optionally, charging the user's credit card 158. There are currently a large number of ways to accomplish this task. In the representative embodiment, the server software 4 is constructed in such a way as to make use of the most efficient method in its configuration.

As the object has been successfully downloaded and the credit card has been charged, the server software 4 terminates the connection with the client 18 with a success code 159. The server software 4 then terminates the transaction process.

Technology Requirements

Software Requirements

AES Enabled Server

The AES Server 2 uses server-side software 4 that is responsible for fulfilling the following functions:

(a) transmit limited functionality objects to a remote client, e.g., 14;

(b) enable the creation of unique objects for online purchase;

(c) accept user customization of said objects;

(d) perform automated server customization of same objects;

(e) produce unique identifiers for each unique object and attach that identifier to the object and purchasing user via the Sales Database 13; and (f) restrict the online use of a unique object to the registered user.

Taking software used for a car collector, the application is able to perform the following.

Assume there is a template object for a standard sedan. The template's rule-set allows the user to specify the color, pinstripes and interior type. The server rule-set requires the server to choose the number plate sequence and chassis number. The server software 4 prompts, via the AES client 18 and ultimately the host application 19, the user for his/her choices. The user selects metallic blue paint, silver pinstripes and a leather interior. The server uses a pre-determined list or algorithm and calculates a unique number plate sequence (e.g. 'W23-176') and chassis number (e.g. 'CMBSL-6179'). The final addition to the new object is a unique internal identifier. The object template's reserved configuration rule-set is then checked by the server. If the user and server customizations are not reserved, they are applied to the object template's base object to construct a new object. This new object is created by taking the components of the base object and modifying and/or adding to them. These modifications result in a new set of components being generated—the new object.

Subsequent to a successful transmission of the object to the user, the object is registered. The internal identifier is used to register the object to the creator (or user). The server software 4 stores the object identifier, customization information and a reference to the registered user in the Sales Database 13. The server software 4 can then use the database 13 to verify that objects are only being used by the correct user.

In this illustration, a new blue car object was created by the server software 4. The object was not extracted from a database as a whole. It was created by taking a base object (that was found in the object database 10) and modifying it on demand. By not having to store each variation of an object in a database, AES servers requires comparatively small amounts of storage.

AES Enabled Client Application

In the representative embodiment of this invention, the host application 19;

(a) queries the AES server over an established Internet connection to determine whether new objects are available for this application;

(b) dynamically downloads new limited functionality objects;

(c) renders (via video, audio and'similar media) limited functionality objects within the application's context;

(d) provides mechanisms whereby users may purchase full functionality objects without exiting the application; and (e) renders (via video, audio and similar media) and allows full user interaction with full functionality objects.

To illustrate the application's required functionality, it is advantageous to consider a simple example.

A user has previously installed an AES enabled car racing program 19. They are currently connected to the interment and begin execution of the car-racing program. While the user is racing, the AES client software 18 contacts the AES server 2. An LFO of a new car is downloaded. The car is then placed into the game, perhaps the next time the user starts a race. Now the user can see the new car and can even race against it. The user cannot, however, drive the car. The AES client 18 has integrated a new game object (the new car) into the game-play without needing to restart.

To gain full control of the new car, the user must obtain the extra functional components. From a user's perspective, this is a simple procedure accessed via an integrated command in the application 19. In this example, the user might simply right click on the car and select "Buy" from the context menu.

The AES client 18 contacts the AES server 2 requesting the FFO of the new car. If user details or customizations are required, the application 19 provides appropriate input dialogs. That information is transferred to the server software 4 for customization of the car. After the server software 4 has created the new car, the AES client 18 receives the fully functional car and integrates it into the application 19. The user can now gain full control of the car.

Data Structures

'Object' definition

An 'object', as described in these pages, refers to a combination of computer data and/or logic that encapsulates or simulates the realization and/or functionality of a real or imaginary object.

The term 'data' includes program code, text, art assets such as 3D models and textures, sounds, music and any other computer generated or encoded material that is used to realize the object.

Should the object contain 'logic', the term 'logic' describes the computer code that an application uses to convey and interpret user and computer interaction with the object.

'Functionality' means the manner in which an object can be utilized by an application. Limitations can be applied to the type of interaction including what can be done with or to the object, the length of time the object can be used and which applications can use the object. Thus, an object's functionality parameterizes the use of a particular object.

Examples of objects are simulations of physical objects such as rocks, machines and animals. The system of the present invention can also handle simulated objects which have no physical appearance such as sounds, music, environmental variables and artificial intelligence modules.

Full Functionality Objects

The present invention can use objects of varying functionality. A full functionality object (FFO) defines an object that contains its entire program code and assets. It is a complete object that has all its requisite object data and/or logic.

The integration of an FFO (or LFO) into a host application 19 can vary depending on which local resources already exist.

Where the user has specified to download a completely new FFO, integration involves two stages. The AES client 18 requests and receives the FFO from the server 2. The FFO is integrated into the host application 19 by informing the host application 19 of the presence of the new object. The host application 19 uses the information about the new object, provided by the AES client 18, and instantiates the new FFO. The host application uses the same instantiation technique that is used to instantiate pre-existing objects.

One of the present inventions powerful abilities is being able to combine new and previously existing data and/or logic to create an FFO. Prior to acquiring an FFO, the user has often downloaded the equivalent LFO. The present invention therefore, can use the pre-existing LFO to create the requested FFO.

As an LFO is a sub-set of the requested FFO (see below), much of the LFO data and/or logic can be reused to form the FFO. The AES client 18 can detect which parts of the FFO need to be obtained from the AES server 2 and which are already present in the LFO. The AES client 18 requests the appropriate parts of the FFO from the AES server 2. In response to the request, the AES server 2 obtains the appropriate components from its databases and transmits only those requested components—not the entire FFO.

Upon receipt of the missing data and/or logic from the AES server 2, the AES client 18 assembles the appropriate components from both the LFO and the server software 4. The client 18 combines the data and/or logic and assembles an FFO. It then informs the host application 19 of the new object's existence.

The assembly of the FFO varies depending on the type of object and the degree of difference between the LFO and FFO. To illustrate the difference in possible data and/or logic combinations, consider the following examples.

Assume there is a host application 19 that allows the user to peruse and drive vintage planes. As the user is examining their planes, the AES client 18 downloads a newly modeled vintage fighter plane. The user can then select the plane and display the plane on screen.

To render the plane on screen the LFO must have data such as a 3D model, appropriate textures and animations and possibly data about famous missions the plane flew. The plane however, needs no logic. The application 19 does not need to be able to make the plane fly realistically as it is an LFO; it is limited to being displayed.

If the user requests the FFO, so they can fly the plane, the only extra information the application needs is the plane's flight information. The AES client 18 need only request the plane's flight logic from the AES server 2. The flight logic would be a small file and would be quickly downloaded. The AES client 18 can add the flight logic to the plane's LFO resources and instruct the host application 19 that a new, full functionality object is available. The application 19 can now re-instantiate the plane, with the flight logic, and the user can fly the plane.

In the above example, only a small addition was required to create the FFO. By simply adding logic to the LFO, an FFO was available to the host application. Below, an example requiring data, rather than logic, for an FFO is illustrated.

A music clip contains a number of elements. The main element of a digital music object is the data which represents the actual song. A user may download a clip of a song (and LFO) to evaluate the song before requesting the full version. Using the AES client software 18, the section of the song already downloaded in the clip can be used to create the full song (the FFO). The user does not have to download the entire full version of the song. The data from the LFO is extracted and combined with the missing data from the AES server 2 to form the FFO. The user can then listen to the full version of the song.

The example of the music samples versus full versions, demonstrates where the logic of an LFO is already valid for the FFO creation but extra data is required. The following example illustrates a situation involving the need for data and logic to be obtained from the AES server.

If a new unit for a game is developed and a user requests an AES enabled application 19 to download the FFO a combination of logic and data is required. The unit's LFO includes a number of assets such as its 3D model, animations, textures and sounds. Logical elements have also been included to allow the application to display and control the unit. This logic and data can be used in the assembly of the unit FFO.

The AES client 18 requests the missing logic and data for the FFO. Using a mixture of the previous two examples, the client 18 firstly adds the logic elements to those contained in the LFO. This allows the user to control the new unit Secondly, missing data elements are requested. This may include extra animations or customized textures to apply to the unit. Again, the data is added to that from the LFO. Thus, using the logic from the LFO and the AES server and the data from the LFO and the AES server, the AES client 18 has constructed a new FFO.

The client then integrates the FFO into the host application 19 from which the new object is instantiated.

Limited Functionality Objects

A limited functionality object (LFO) is a subset of an FFO. An LFO does not contain the entire object. There is adequate data and/or logic for a host application 19 to instantiate the LFO but certain sections of the object are absent as compared to the equivalent FFO (the superset).

As the name implies, an LFO can limit the functionality of an object. As such, the manner in which an object can be utilized by an application can be restricted based on a set of criteria. The object's creator can limit, for instance, what actions the LFO can perform, the length of time it can be used and which applications can use it. An example that illustrates a possible use of an LFO is found in terms of music.

An AES enabled music application 19 downloads an LFO The LFO contains a short dip of a new song. The object also contains the name of the song, information about the band, the number of times the clip can be played and the time and date when the clip will expire.

The music application allows the user to listen to the clip for the specified time period and number of times. After either criteria expires, the user can only access the song's title and band information. The object is functionally limited as it can no longer be played.

By being able to create an LFO from a base template, the AES invention also allows enhanced user previewing. By reducing the functionality of an object, the user can experience the overall impression of the object before deciding to obtain the fully functional version.

LFOs allow the application developer to keep the user informed of object additions. LFOs are displayed as they become available, so the user is immediately informed of any new object. An example better demonstrates this unique ability.

In the Object Database 10 there may be a number of car objects. When an AES client 18 connects requesting a new car object, the server software 4 queries the Object Database 10 for car objects. The Object Database 10 responds that it has a number of cars. The AES server software 4 chooses a random car object and request its LFO from the Object Database 10. The LFO returned contains most of the components required to operate in the AES client 18. For a car, this would include, for instance, the 3D car model (or mesh), the appropriate textures (or graphics), its physics model and the engine specifications. With these components, the AES client 18 can allow limited user interaction. The components required to actually control the car are not, however, in the LFO. They are omitted and therefore limit the functionality of the car. The user can see the car but is not able to control it unless the rest of the logic and/or data is downloaded from the AES server 2.

The above example is a simple demonstration of how an LFO can be used to inform the user of an addition to the original program.

In addition to the above capabilities, an LFO can form the basis of an FFO. The process of combining new components with an LFO is described above in the FFO description.

User Customization

The present invention allows user customization of objects. The customizations are made using an AES enabled host application 19. The possible customization platforms include, but are not limited to, an AES enabled application 19 and from within a web browser.

To customize an object, the host application 19, for example, prompts the user for the required details. After the user has supplied the details, the server software 4 creates an object fitting those criteria. The data supplied by the user, although only a small amount, can greatly vary the object's formation and subsequent realization or definition.

Not all aspects of an object are necessarily customizable. Each object contains a set of rules (a rule-set) governing which elements a user can customize. The rule-set can take the form of an array, a list or even a bit-set. The actual format of the rule-set depends on the type and context of the object in question.

AES Customization

In addition to user customizations, the AES server software 4 can also modify objects. Each object template contains a rule-set that defines the customizations a server may make before releasing an object.

The rule-set may include requirements such as the required bit-rate of a video object's soundtrack or the sequence of numbers and letters in a car object's license plate. The rule-set can also be used to add unique identification numbers to objects. As explained in Sales database 13, such a number can be used to decrease piracy and confirm ownership.

Customization Restrictions

To heighten the control over each object type's possible realizations and/or forms, the present invention can use customization restrictions. The restrictions, if any, are contained in a rule-set within each object template.

When the user and server customization are complete, the resultant object is compared with the disallowed or reserved configurations. If there is a conflict between the new objects and the restricted configurations, the user and server software 4 again attempt the customization process.

By withholding certain configurations, value and rarity can be added to AES objects. This may not be immediately apparent but certain configurations are more valuable than others. For instance, being able to ensure that no imitations of a limited number of a specifically configured objects are released will maintain the rarity and value of the limited objects.

The present invention has been described above in the context of browsing on the World Wide Web. However, the present invention is of general applicability and is not limited to this application. While the present invention has been particularly shown and described with reference to representative embodiments, it will be understood by those skilled in the art that various changes in form and details may be made without departing from the spirit and scope of the invention.

What is claimed is:

1. A computer-implemented method for enabling a user to obtain a program object for use in a host application running on a client computer, the client computer coupled to a server computer via a network, the method comprising the steps of:
   (a) enabling the user to select a program object;
   (b) customizing the program object according to user input;
   (c) at the server computer, automatically customizing the program object according to a rule-set in a program object template corresponding to the selected program object to create a limited functionality object;
   (d) downloading the limited functionality object from the server computer to the client computer;
   (e) allowing the host application to utilize the limited functionality object;
   (f) upon user request at the client computer, sending a request to the server computer to obtain full functionality object corresponding to the limited functionality object;
   (g) at the client computer, determining a set of program parts required to create the full functionality object from the limited functionality object;
   (h) downloading the set of program parts from the server computer to the client computer;
   (i) at the client computer, combining the set of program parts and the limited functionality object to create the full functionality object; and
   (j) allowing the host application to utilize the full functionality object.

2. A computer-implemented method for enabling a user to obtain a program object for use in a host application running on a client computer, the client computer coupled to a server computer via a network, the method comprising the steps of:
   (a) at the server computer, customizing the program object according to a rule-set to create a limited functionality object;
   (b) downloading the limited functionality object from the server computer to the client computer;
   (c) integrating the limited functionality object in the host application;
   (d) under control of the host application, outputting the limited functionality object to the user wherein the user cannot control actions of the limited functionality object;
   (e) upon user request at the client computer, sending a request to the server computer to obtain a full functionality object corresponding to the limited functionality object;
   (f) downloading computer code from the server computer to the client computer, said computer code able to yield the full functionality object when combined with the limited functionality object;
   (g) at the client computer, combining said computer code and the limited functionality object to yield the full functionality object; and
   (h) integrating the full functionality object in the host application such that the user can control actions of the full functionality object when using the host application.

3. The method of claim 2 wherein the step of integrating the full functionality object in the host application comprises integrating the full functionality object in the host application without halting or restarting the host application.

4. The method of claim 2 wherein the step of integrating the limited functionality object in the host application comprises integrating the limited functionality object in the host application without halting or restarting the host application.

5. The method of claim 2 wherein the step of customizing the program object according to a rule-set to create a limited functionality object further comprises customizing the program object according to a rule-set to create a unique limited functionality object that is only created once.

6. A computer-implemented method for enabling a user to obtain a program object for use in a host application running on a client computer, the client computer coupled to a server computer via a network, the method comprising the steps of:
   (a) enabling the host application to display a limited functionality object at the client computer;
   (b) enabling the user the ability to select the limited functionality object;

(c) upon said selection, sending to the server computer a request for a full functionality object corresponding to the limited functionality object;

(d) receiving functional components at the client computer from the server computer in response to said request for the full functionality object, wherein the step of receiving the full functionality object further comprises receiving at the client computer a unique full functionality object that is only created once;

(e) at the client computer, integrating the received functional components with the limited functionality object to create the full functionality object;

(f) at the client computer, integrating the full functionality object with the host application without halting or restarting the host application; and (g) allowing the user to manipulate the full functionality object.

7. The method of claim 6 further comprising the step of enabling the user to provide identifying data and payment data to the server computer.

8. The method of claim 6 further comprising the step of transmitting the full functionality object to a second client computer from the client computer.

9. An e-commerce system distributing program objects for use in a host application, the system operating over a network, comprising:

(a) a client computer running the host application;

(b) a server computer coupled to the client computer via the network;

(c) a program object template stored at the server computer;

(d) means, located at the server computer, for customizing the program object template according to a rule-set to create a limited functionality object;

(e) means for downloading the limited functionality object from the server computer to the client computer;

(f) means, located at the client computer, for integrating the limited functionality object in the host application;

(g) means, operating under control of the host application, for outputting the limited functionality object to the user wherein the user cannot control the limited functionality object;

(h) means, located at the client computer, for sending a request to the server computer to obtain a full functionality object corresponding to the limited functionality object;

(i) means, located at the server computer, for sending functional components to the client computer in response to said request to obtain the full functionality object;

(j) means to create the full functionality object from the limited functionality object and the received functional components; and (k) means, located at the client computer, for integrating the full functionality object in the host application such that the user can control the full functionality object when using the host application.

10. In a network comprising a client computer running a host application and coupled to a server computer, a system to distribute program objects via the network, comprising:

one or more program object templates stored at the server computer in a database, each program object template providing a definition for a program object and rule-set to create the program object;

a server computer program running on the server computer, the server computer program accessing the program object templates and creating limited functionality program objects and functional components required to create full functionality program objects from corresponding limited functionality program objects, and transmitting said functional components to the client computer;

a sales database at the server computer for storing details regarding each person who obtains a full functionality program object; and a client computer program running on the client computer in conjunction with the host application, the client computer program enabling the host application to request and receive functional components from the server computer program and to integrate (i) the received functional components with limited functionality objects to create full functionality objects and (ii) the full functionality objects with the host application;

wherein a limited functionality object, when executed by the host application, is displayed but cannot be controlled by a user; and wherein a fill functionality object, when executed by the host application, is displayed and can be controlled by the user.

* * * * *